US012427646B2

(12) United States Patent
Leen et al.

(10) Patent No.: US 12,427,646 B2
(45) Date of Patent: Sep. 30, 2025

(54) SCRIBING DEVICE

(71) Applicant: Solar Turbines Incorporated, San Diego, CA (US)

(72) Inventors: Tom Leen, San Diego, CA (US); David Jeorling, Temecula, CA (US); Jose Vigo Molina, Chula Vista, CA (US); Garrett Gauthier, Carlsbad, CA (US)

(73) Assignee: Solar Turbines Incorporated, San Diego, CA (US)

(*) Notice: Subject to any disclaimer, the term of this patent is extended or adjusted under 35 U.S.C. 154(b) by 331 days.

(21) Appl. No.: 18/156,524

(22) Filed: Jan. 19, 2023

(65) Prior Publication Data

US 2024/0246221 A1 Jul. 25, 2024

(51) Int. Cl.
*B25H 7/04* (2006.01)

(52) U.S. Cl.
CPC .................................... *B25H 7/04* (2013.01)

(58) Field of Classification Search
CPC ........................................................ B25H 7/04
See application file for complete search history.

(56) References Cited

U.S. PATENT DOCUMENTS 1,927,992 A * 9/1933 Pulver .................... G01C 15/00 138/45
2,777,199 A * 1/1957 Anders ................. B43L 11/055 33/18.1
3,755,904 A * 9/1973 Kestler .................... A61C 9/00 33/18.1
5,507,212 A * 4/1996 Morrison ................. B25H 7/04 83/564
5,860,220 A 1/1999 Gerd
6,802,128 B1 * 10/2004 Yang ....................... B44B 3/001 33/18.1
6,826,840 B1 * 12/2004 Lindsey ............ H01L 21/67092 33/549
7,165,331 B1 * 1/2007 Lindsey, Jr ....... H01L 21/67092 33/549
8,359,756 B2 * 1/2013 Soyama ................ C03B 33/037 33/18.1

(Continued)

FOREIGN PATENT DOCUMENTS

CN 101992507 B * 6/2013
CN 106426068 A 2/2017

(Continued)

*Primary Examiner* — Yaritza Guadalupe-Mccall

(57) ABSTRACT

A scribing device for a component includes a holder and a first scribing assembly coupled to the holder. The first scribing assembly includes a first scribing tool including a first scribing tip configured to define a first annular scribe mark on a circumferential surface of the component, and a first biasing member configured to bias the first scribing tool towards the circumferential surface of the component. The scribing device further includes a second scribing assembly. The second scribing assembly includes a second scribing tool including a second scribing tip configured to define a second annular scribe mark on the circumferential surface of the component, and a second biasing member configured to bias the second scribing tool towards the circumferential surface of the component.

19 Claims, 8 Drawing Sheets

(56) References Cited

U.S. PATENT DOCUMENTS

| | | | | |
|---|---|---|---|---|
| 2003/0051353 A1* | 3/2003 | Gartner | C03B 33/09 | 33/18.1 |
| 2010/0192393 A1* | 8/2010 | Smith | E04F 21/0076 | 33/32.1 |
| 2024/0246221 A1* | 7/2024 | Leen | B25H 7/04 | |

FOREIGN PATENT DOCUMENTS

| | | | | |
|---|---|---|---|---|
| CN | 209440136 | U | | 9/2019 |
| CN | 107283384 | A | | 1/2020 |
| CN | 214136033 | U | | 9/2021 |
| CN | 111809897 | A | | 10/2021 |
| CN | 219381112 | U | * | 7/2023 |
| CN | 220561536 | U | * | 3/2024 |

* cited by examiner

SCRIBING DEVICE

TECHNICAL FIELD

The present disclosure relates to a scribing device for a component and a method of scribing the component.

BACKGROUND

Rotor disks associated with a compressor or a turbine are typically coupled with other components, such as, an airfoil during an assembly of a gas turbine engine. Typically, one or more components may be welded to the rotor disk during assembly. Further, scribe lines need to be defined on each rotor disk in order to utilize a scribe line method of determining a location of a weld relative to a weld seam after the weld is completed. Each rotor disk may have two scribe lines that need to be scribed at a set distance from an edge of the rotor disk at a proper depth. Conventional scribe marking tools may not allow accurate and precise marking of the scribe lines at desired locations. Further, it may be time consuming to mark the scribe lines using conventional scribe marking tools.

CN209440136U describes a portable scribing device which includes a base plate, a scale disc, and a bidirectional telescopic connecting plate. A strong magnet is fixed in the base plate, and the base plate is attracted and fixed to a target position on a main plate through the strong magnet. The scale disc is arranged above the base plate, first scales are arranged on the circumferential edge of the scale disc, the two-way telescopic connecting plate is arranged above the scale disc, and two scribing pens capable of sliding in the length direction of the two-way telescopic connecting plate are symmetrically arranged on the two-way telescopic connecting plate.

SUMMARY OF THE DISCLOSURE

In an aspect of the present disclosure, a scribing device for a component is provided. The scribing device includes a holder including a first rail portion and a second rail portion in alignment with the first rail portion. The scribing device also includes a first scribing assembly coupled to the holder. The first scribing assembly is slidable along the first rail portion of the holder to dispose the first scribing assembly at any one of a plurality of locations along the first rail portion. The first scribing assembly includes a first scribing tool including a first scribing tip configured to define a first annular scribe mark on a circumferential surface of the component. A first perpendicular distance is defined between the first scribing tip and the first rail portion of the holder along a holder axis. The first scribing assembly also includes a first biasing member configured to bias the first scribing tool towards the circumferential surface of the component. The scribing device further includes a second scribing assembly coupled to the holder and disposed in alignment with the first scribing assembly. The second scribing assembly is slidable along the second rail portion of the holder to dispose the second scribing assembly at any one of a plurality of locations along the second rail portion. The second scribing assembly includes a second scribing tool including a second scribing tip configured to define a second annular scribe mark on the circumferential surface of the component. A second perpendicular distance is defined between the second scribing tip and the second rail portion of the holder along the holder axis. The first perpendicular distance is different than the second perpendicular distance.

The second scribing assembly also includes a second biasing member configured to bias the second scribing tool towards the circumferential surface of the component.

In another aspect of the present disclosure, a method of scribing a component is provided. The method includes positioning a scribing device on the component. The scribing device includes a holder, a first scribing assembly coupled to the holder and including a first scribing tool and a first biasing member, and a second scribing assembly coupled to the holder and including a second scribing tool and a second biasing member. The method also includes biasing the first scribing tool towards a circumferential surface of the component via the first biasing member such that the first scribing tool is in engagement with the component. The method further includes biasing the second scribing tool towards the circumferential surface of the component via the second biasing member such that the second scribing tool is in engagement with the component. The method includes rotating the scribing device relative to the component. The method also includes defining a first annular scribe mark on the circumferential surface of the component based on the engagement of the first scribing tool with the component and the rotation of the scribing device relative to the component. The method further includes defining a second annular scribe mark on the circumferential surface of the component based on the engagement of the second scribing tool with the component and the rotation of the scribing device relative to the component. The first annular scribe mark is axially spaced apart from the second annular scribe mark.

In yet another aspect of the disclosure, a scribing device for a component is provided. The scribing device includes a holder including a rail portion. The scribing device also includes a scribing assembly coupled to the holder. The scribing assembly is slidable along the rail portion of the holder to dispose the scribing assembly at any one of a plurality of locations along the rail portion. The scribing assembly includes a scribing tool including a first scribing tip configured to define a first annular scribe mark on a circumferential surface of the component. A first perpendicular distance is defined between the first scribing tip and a surface of the rail portion of the holder along a holder axis. The scribing assembly also includes a biasing member configured to bias the scribing tool towards the circumferential surface of the component.

Other features and aspects of this disclosure will be apparent from the following description and the accompanying drawings.

DETAILED DESCRIPTION

Wherever possible, the same reference numbers will be used throughout the drawings to refer to the same or like parts.

Figure 1:
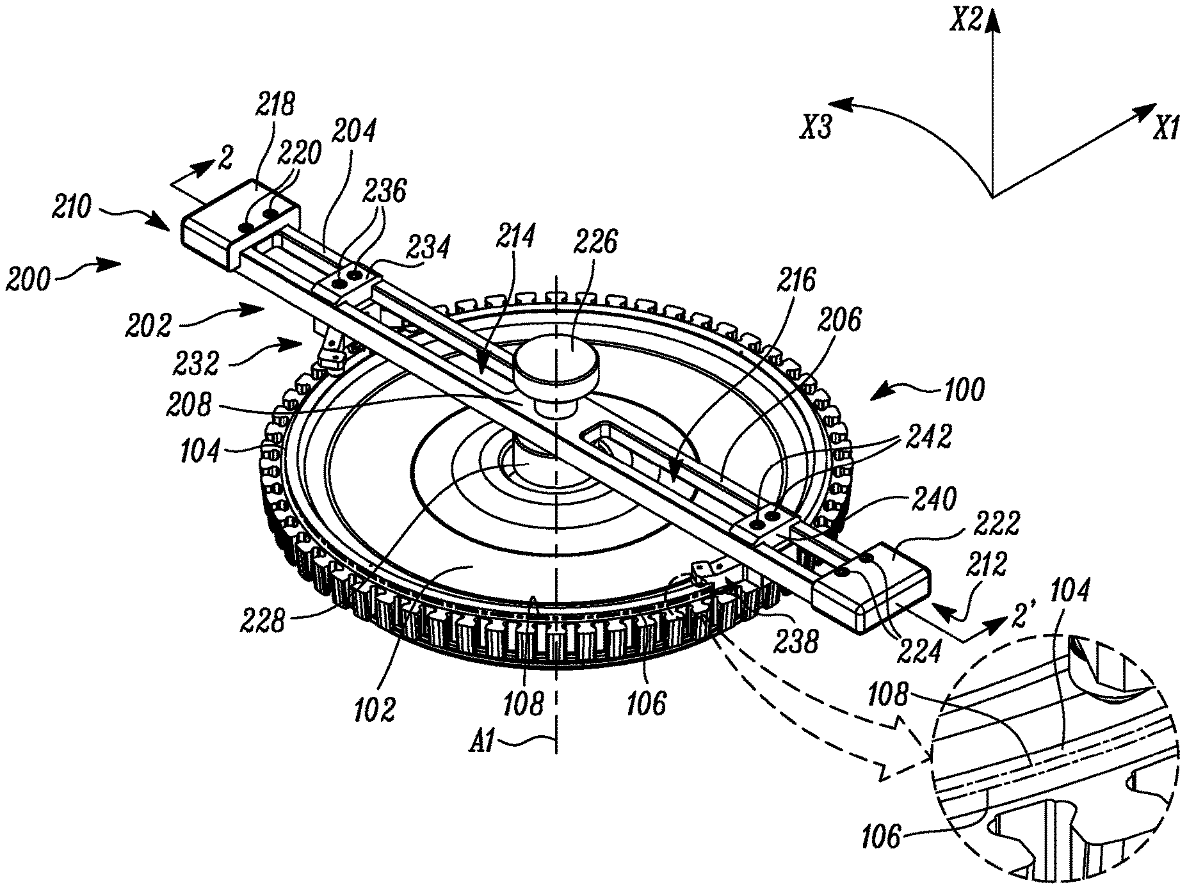
FIG. 1 is a schematic perspective view of a component and a scribing device for scribing the component, according to an example of the present disclosure.

Referring to FIG. 1, a schematic perspective view of a component 100 and a scribing device 200 is illustrated, according to an example of the present disclosure. The scribing device 200 is used to define scribe lines or scribe marks on the component 100. In an example, the component 100 may be made from a metallic material. The component 100 may include any component having a circumferential surface. The component 100 is embodied as a rotor disk herein. The rotor disk may be associated with a compressor or a turbine of a gas turbine engine, without any limitations thereto.

The component 100 defines a radial surface 102 defined along a radial direction “X1”. Further, the component 100 defines a circumferential surface 104 extending in an axial direction “X2” and a circumferential direction “X3”. The scribing device 200 is used to mark a first annular scribe mark 106 and a second annular scribe mark 108 on the circumferential surface 104 of the component 100. The first annular scribe mark 106 and the second annular scribe mark 108 are defined before a welding operation. Further, the first annular scribe mark 106 is axially spaced apart from the second annular scribe mark 108. Specifically, the first annular scribe mark 106 and the second annular scribe mark 108 are spaced apart from each other along the axial direction “X2”.

The scribing device 200 includes a holder 202. The holder 202 defines a holder axis “A1”. The holder 202 includes a first rail portion 204 and a second rail portion 206 in alignment with the first rail portion 204. Each of the first and second rail portions 204, 206 extends orthogonal to the holder axis “A1”. Specifically, the holder 202 includes a longitudinal member 208 defining a first end 210 and a second end 212. The longitudinal member 208 includes the first rail portion 204 and the second rail portion 206. As shown in FIG. 1, the first rail portion 204 defines a first elongate slot 214 and the second rail portion 206 defines a second elongate slot 216. Further, the holder 202 includes a first handle 218 coupled to the longitudinal member 208 at the first end 210. The first handle 218 is removably coupled to the first rail portion 204 via a pair of first mechanical fasteners 220. The holder 202 also includes a second handle 222 coupled to the longitudinal member 208 at the second end 212. The second handle 222 is removably coupled to the second rail portion 206 via a pair of second mechanical fasteners 224. Each of the first and second mechanical fasteners 220, 224 may include bolts, screws, pins, and the like. Alternatively, the holder 202 could be integrally formed as a single piece.

Figure 2:
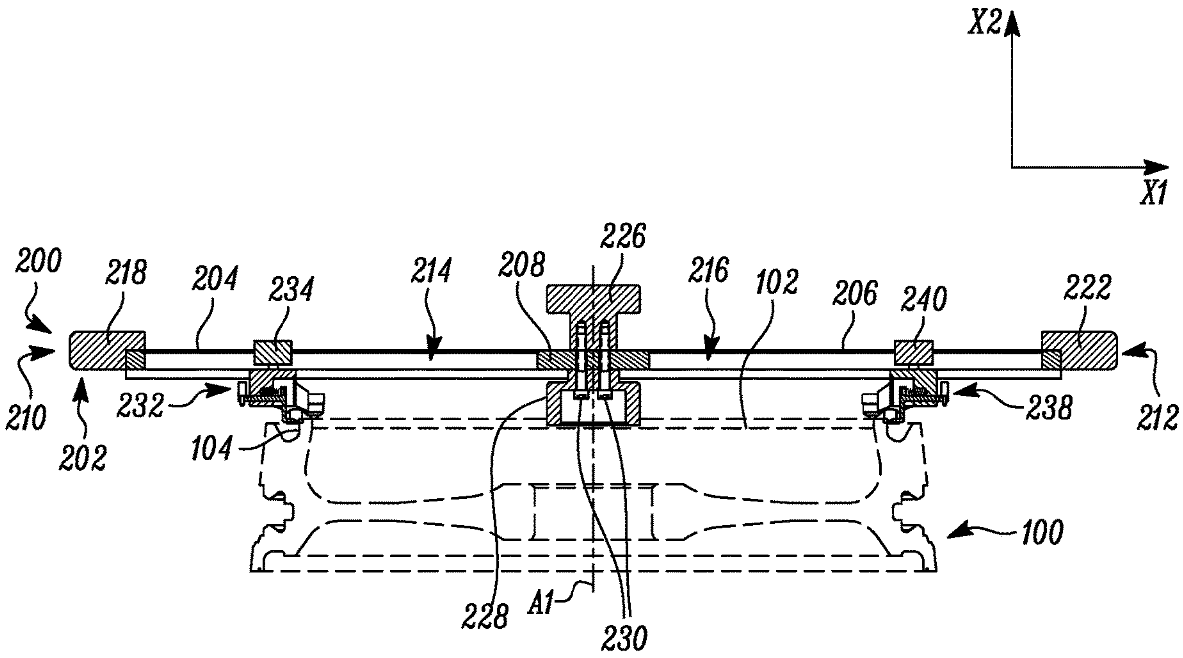
FIG. 2 is a schematic sectional view of the scribing device of FIG. 1, along 2-2', according to an example of the present disclosure.

FIG. 2 illustrates a schematic sectional view of the scribing device 200 and the component 100. The component 100 is illustrated with hidden lines in FIGS. 2, 5, and 7 so as to differentiate the scribing device 200 from the component 100. Referring now to FIG. 2, the holder 202 further includes a spinner 226 coupled to the longitudinal member 208 and centrally disposed between the first end 210 and the second end 212. The spinner 226 is cylindrical in shape and includes a stepped design. The spinner 226, the first handle 218, and the second handle 222 may assist a user/operator to rotate the scribing device 200 relative to the component 100. Further, the holder 202 includes a stand 228. The stand 228 can rest on a horizontal surface when the holder 202 is not in use. As can be seen in FIG. 1, stand 228 is dimensioned so as to be able to fit within a bore in the component 100. The stand 228 is removably coupled to the longitudinal member 208 and the spinner 226. The stand 228 is cylindrical in shape. Further, the stand 228 is removably coupled to the longitudinal member 208 and the spinner 226 via a pair of third mechanical fasteners 230. The third mechanical fasteners 230 may include bolts, screws, pins, and the like. In some examples, the holder 202 may be made from a material that may be light in weight and sturdy. The holder 202 may be made of a metallic material, a non-metallic material, a composite material, and the like.

The scribing device 200 includes a first scribing assembly 232 coupled to the holder 202. The first scribing assembly 232 is slidable along the first rail portion 204 of the holder 202 to dispose the first scribing assembly 232 at any one of a number of locations along the first rail portion 204. Specifically, the first scribing assembly 232 is longitudinally slidable along the first rail portion 204, orthogonal to the holder axis “A1”. Further, the scribing device 200 includes a first clamping member 234 and one or more first fasteners 236 (see FIG. 1) that couple the first scribing assembly 232 to the first rail portion 204. The first clamping member 234 is substantially T-shaped. A portion of the first clamping member 234 engages with the first rail portion 204 and a portion of the first clamping member 234 is received within the first elongate slot 214 and engages with the first scribing assembly 232. The one or more first fasteners 236 include a pair of first fasteners 236 herein. Further, the pair of first fasteners 236 may include bolts, screws, pins, and the like. The pair of first fasteners 236 may be removed or loosened to adjust a position of the first scribing assembly 232 relative to the holder axis “A1”. Furthermore, the pair of first fasteners 236 may be coupled and tightened to the first scribing assembly 232 and the first clamping member 234 to dispose and secure the first scribing assembly 232 at any desired location along the first rail portion 204 based on a dimension of the component 100.

The scribing device 200 further includes a second scribing assembly 238 coupled to the holder 202 and disposed in alignment with the first scribing assembly 232. The second scribing assembly 238 is slidable along the second rail portion 206 of the holder 202 to dispose the second scribing assembly 238 at any one of a number of locations along the second rail portion 206. Specifically, the second scribing assembly 238 is longitudinally slidable along the second rail portion 206, orthogonal to the holder axis “A1”. Further, the scribing device 200 includes a second clamping member 240 and one or more pair of second fasteners 242 (see FIG. 1) that couple the second scribing assembly 238 to the second rail portion 206. The second clamping member 240 is substantially T-shaped. A portion of the second clamping member 240 engages with the second rail portion 206 and a portion of the second clamping member 240 is received within the second elongate slot 216 and engages with the second scribing assembly 238. The one or more second fasteners 242 include a pair of second fasteners 242 herein. Further, the pair of second fasteners 242 may include bolts, screws, pins, and the like. The pair of second fasteners 242 may be removed or loosened to adjust a position of the second scribing assembly 238 relative to the holder axis "A1" of the longitudinal member 208. Furthermore, the pair of second fasteners 242 may be coupled and tightened to the second scribing assembly 238 and the second clamping member 240 to dispose and secure the second scribing assembly 238 at any desired location along the second rail portion 206 based on the dimension of the component 100.

Figure 3:
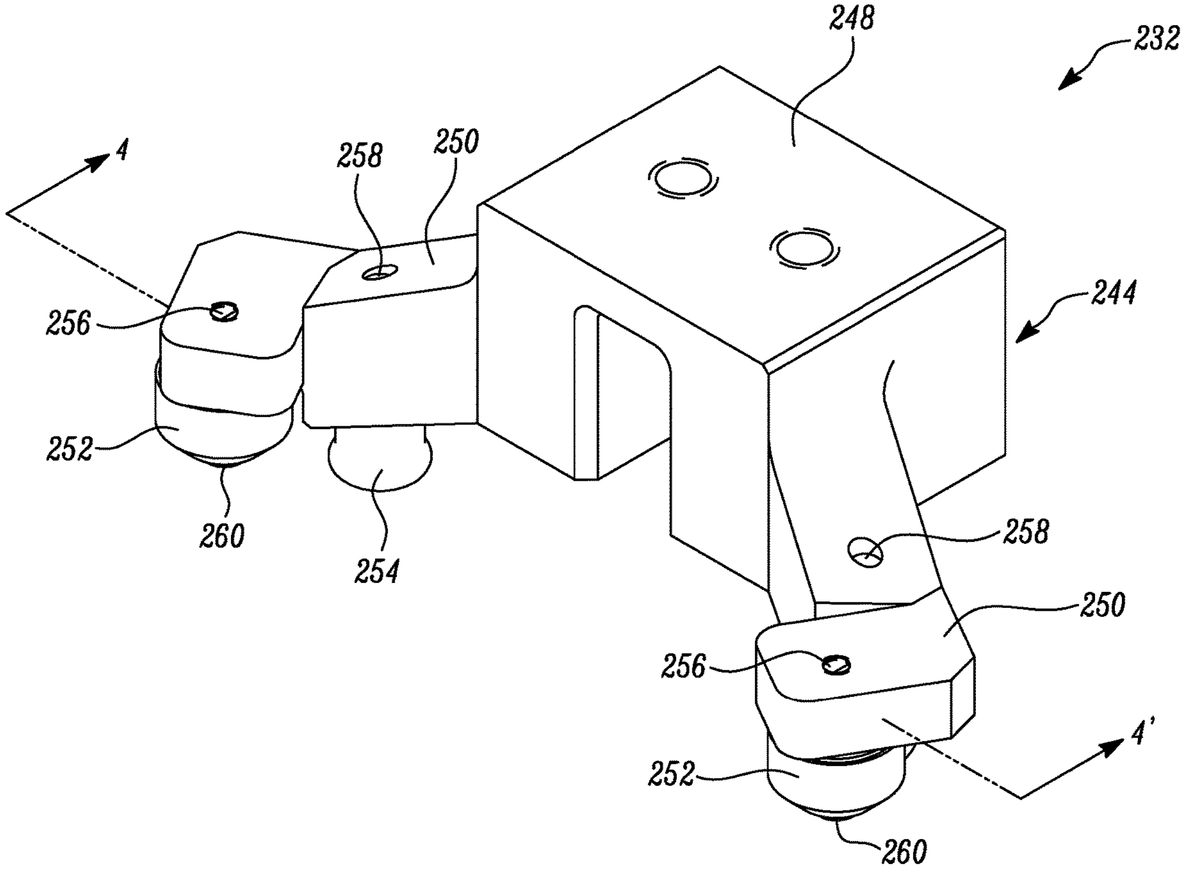
FIG. 3 is a schematic perspective view of a first scribing assembly associated with the scribing device of FIGS. 1 and 2.

Referring now to FIG. 3, the first scribing assembly 232 includes a first housing 244. The first housing 244 includes a first central portion 248, and a pair of first projections 250 extending from the first central portion 248. The first scribing assembly 232 further includes a pair of first glides 252 configured to engage with the radial surface 102 (see FIG. 1) of the component 100 (see FIG. 1) during the scribing of the component 100 and a pair of first aligning elements 254 (in FIG. 3 only one first aligning element 254 is illustrated, the other is hidden from this view) configured to engage with the circumferential surface 104 (see FIG. 1) of the component 100 during the scribing of the component 100.

Figure 4:
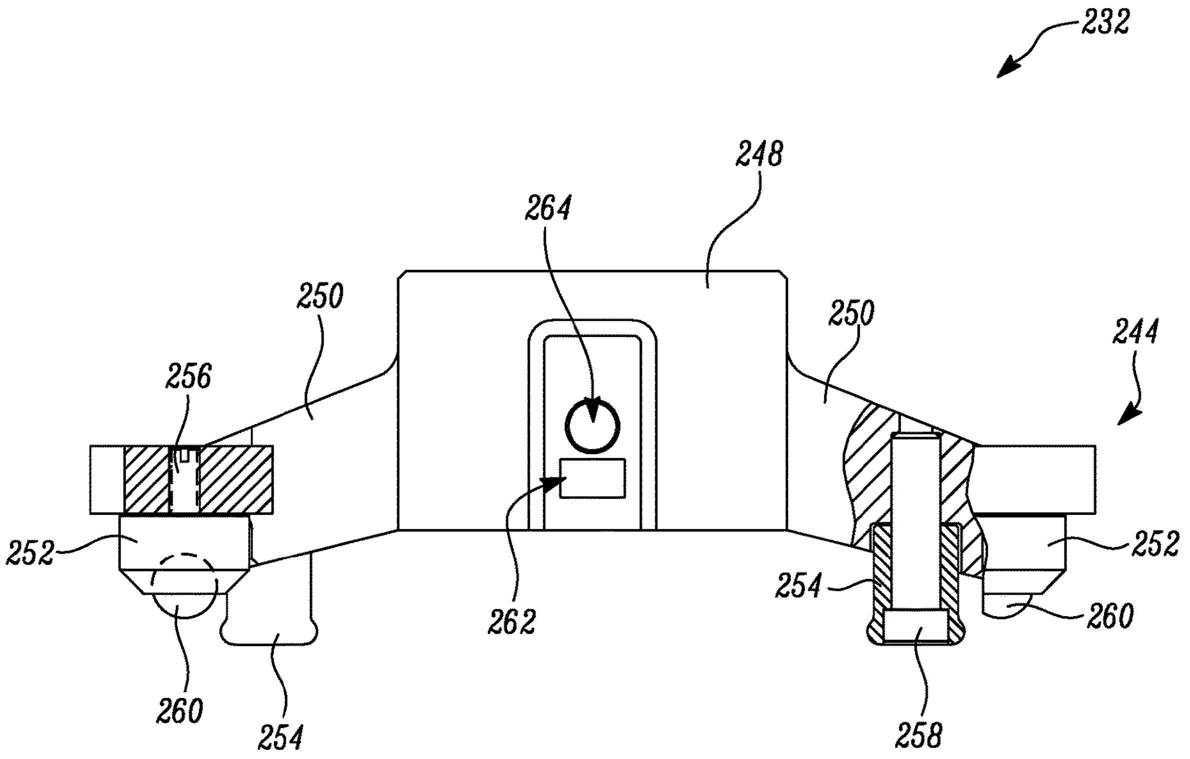
FIG. 4 is a schematic front sectional view, along 4-4', of the first scribing assembly of FIG. 3.

The pair of first glides 252 and the pair of first aligning elements 254 are removably coupled to the first housing 244. Specifically, as shown in FIG. 4, each first projection 250 is coupled to a corresponding first glide 252 and a corresponding first aligning element 254. In an example, each first projection 250 is coupled to a corresponding first glide 252 by a fastener 256 and each first projection 250 is coupled to a corresponding first aligning element 254 by a fastener 258. Further, each first glide 252 includes a first roller 260 that may contact the radial surface 102 when the scribing device 200 is positioned on the component 100 (see FIG. 1). Furthermore, as shown in FIG. 4, the first central portion 248 defines a first rectangular opening 262 and a first circular slot 264.

Figure 5:
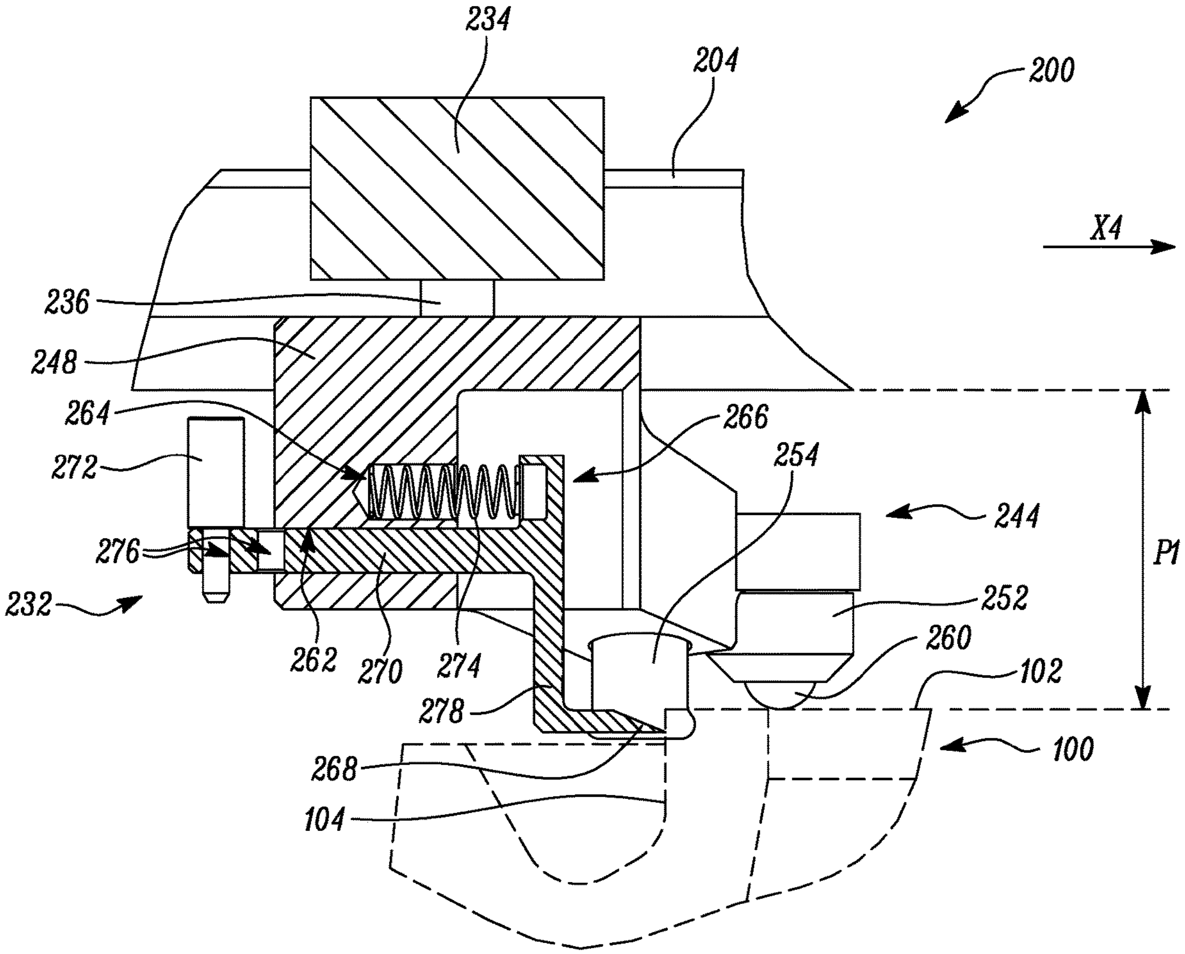
FIG. 5 is a schematic side sectional view of the first scribing assembly associated with the scribing device of FIGS. 1 and 2.

Referring now to FIG. 5, the first scribing assembly 232 includes a first scribing tool 266. The first scribing tool 266 includes a first scribing tip 268 configured to define the first annular scribe mark 106 (see FIG. 1) on the circumferential surface 104 of the component 100. Further, a first perpendicular distance "P1" is defined between the first scribing tip 268 and the first rail portion 204 of the holder 202 along the holder axis "A1" (see FIG. 1). The first housing 244 couples the first scribing tool 266 to the holder 202. In some examples, the first scribing tool 266 may be made from a metal or an alloy. In an example, the first scribing tool 266 may be made of tool steel. However, it may be contemplated that the first scribing tool 266 may be made from any other material, or combination of materials, as per application requirements.

The first scribing tool 266 includes a first coupling portion 270 coupled to a first biasing member 274 and the first housing 244. The first coupling portion 270 is receivable within the first rectangular opening 262 of the first housing 244. The first coupling portion 270 defines a pair of first through-holes 276. The first scribing tool 266 further includes a first scribing portion 278 extending from the first coupling portion 270 and including the first scribing tip 268.

Further, the first scribing assembly 232 includes a first pin 272 coupled to the first scribing tool 266. The first pin 272 prevents a removal of the first scribing tool 266 from the first housing 244. The first pin 272 is removably coupled to the first coupling portion 270 of the first scribing tool 266. The first pin 272 includes a stepped design and is removably received within any one of the first through-holes 276 defined in the first pin 272. In some embodiments, only a single first through-hole 276 may be provided. The first pin 272 may limit a travel of the first scribing tool 266 along a direction "X4".

The first scribing assembly 232 further includes the first biasing member 274 configured to bias the first scribing tool 266 towards the circumferential surface 104 of the component 100. The first biasing member 274 is disposed between the first housing 244 and the first scribing tool 266. Further, the first biasing member 274 is partially received within the first circular slot 264 in the first housing 244 (alternatively, the slot 264 can have a non-circular shape). The first biasing member 274 biases the first scribing tool 266 along the direction "X4" so that the first scribing tool 266 engages with the component 100. The first biasing member 274 is embodied as a compression spring herein. Alternatively, the first biasing member 274 may include any other biasing device known in the art. In some examples, the first pin 272 may prevent any unintentional removal of the first scribing tool 266 from the first housing 244 when the first biasing member 274 is in an unbiased condition.

Figure 6:
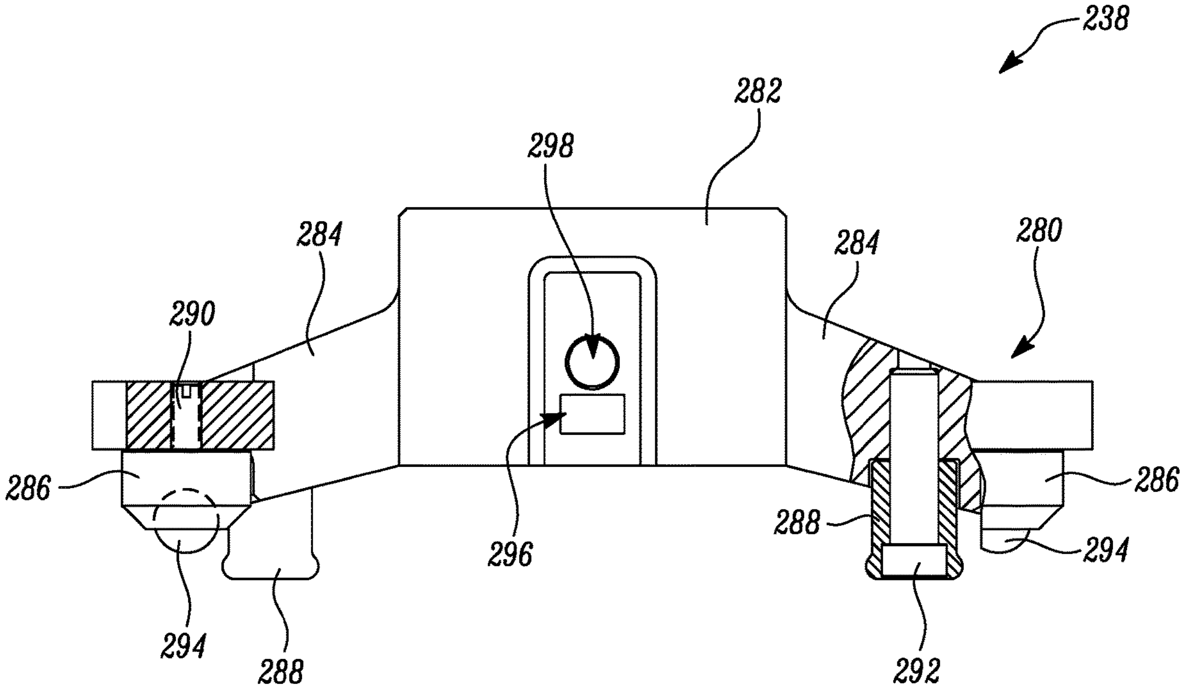
FIG. 6 is a schematic front sectional view, comparable to FIG. 4, of a second scribing assembly associated with the scribing device of FIGS. 1 and 2.

Referring now to FIG. 6, the second scribing assembly 238 includes a second housing 280. The second housing 280 includes a second central portion 282, and a pair of second projections 284 extending from the second central portion 282. The second scribing assembly 238 further includes a pair of second glides 286 configured to engage with the radial surface 102 (see FIG. 1) of the component 100 (see FIG. 1) during the scribing of the component 100 and a pair of second aligning elements 288 configured to engage with the circumferential surface 104 (see FIG. 1) of the component 100 during the scribing of the component 100.

The pair of second glides 286 and the pair of second aligning elements 288 are removably coupled to the second housing 280. Specifically, as shown in FIG. 6, each second projection 284 is coupled to a corresponding second glide 286 and a corresponding second aligning element 288. In an example, each second projection 284 is coupled to a corresponding second glide 286 by a fastener 290 and each second projection 284 is coupled to a corresponding second aligning element 288 by a fastener 292. Further, each second glide 286 includes a second roller 294 that may contact the radial surface 102 when the scribing device 200 is positioned on the component 100. Furthermore, the second central portion 282 defines a second rectangular opening 296 and a second circular slot 298.

Figure 7:
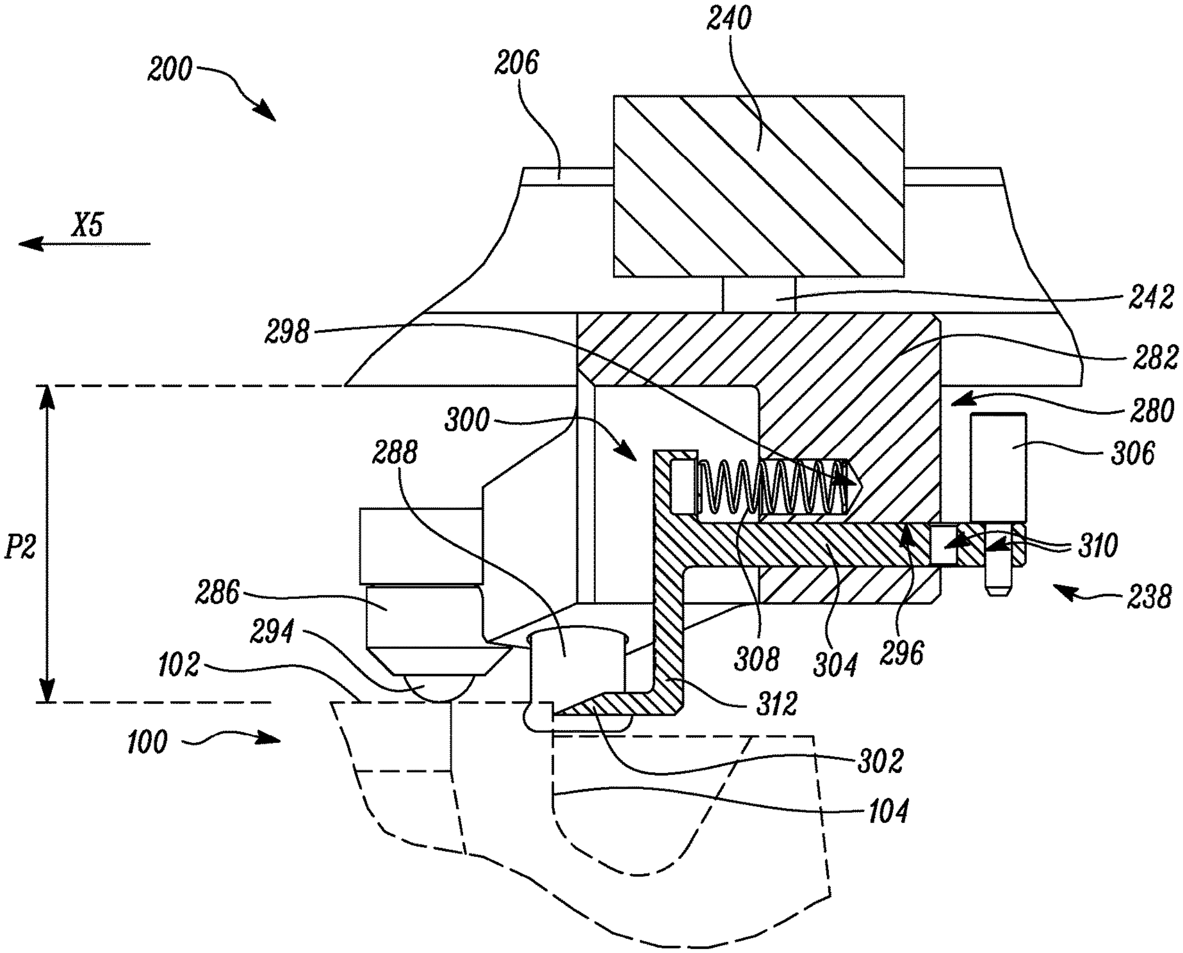
FIG. 7 is a schematic side sectional view, comparable to FIG. 5, of the second scribing assembly associated with the scribing device of FIGS. 1 and 2.

Referring now to FIG. 7, the second scribing assembly 238 includes a second scribing tool 300. The second scribing tool 300 includes a second scribing tip 302 configured to define the second annular scribe mark 108 (see FIG. 1) on the circumferential surface 104 of the component 100. Further, a second perpendicular distance "P2" is defined between the second scribing tip 302 and the second rail portion 206 of the holder 202 along the holder axis "A1" (see FIG. 1). The first perpendicular distance "P1" is different than the second perpendicular distance "P2". In the illustrated embodiment of FIG. 7, the first perpendicular distance "P1" is greater than the second perpendicular distance "P2". The second housing 280 couples the second scribing tool 300 to the holder 202. In some examples, the second scribing tool 300 may be made from a metal or an alloy. In an example, the second scribing tool 300 may be made of tool steel. However, it may be contemplated that the second scribing tool 300 may be made from any other material, or combination of materials, as per application requirements.

The second scribing tool 300 includes a second coupling portion 304 coupled to a second biasing member 308 and the second housing 280. The second coupling portion 304 is receivable within the second rectangular opening 296 of the second housing 280. The second coupling portion 304 defines a pair of second through-holes 310. The second scribing tool 300 further includes a second scribing portion 312 extending from the second coupling portion 304 and including the second scribing tip 302.

The second scribing assembly 238 further includes a second pin 306 coupled to the second scribing tool 300. The second pin 306 prevents a removal of the second scribing tool 300 from the second housing 280. The second pin 306 is removably coupled to the second coupling portion 304 of the second scribing tool 300. The second pin 306 includes a stepped design and is removably received within any one of the second through-holes 310 defined in the second pin 306. In some embodiments, only a single second through-hole 310 may be provided. The second pin 306 may limit a travel of the second scribing tool 300 along a direction "X5".

The second scribing assembly 238 further includes the second biasing member 308 configured to bias the second scribing tool 300 towards the circumferential surface 104 of the component 100. The second biasing member 308 is disposed between the second housing 280 and the second scribing tool 300. Further, the second biasing member 308 is partially received within the second circular slot 298 in the second housing 280 (alternatively, the slot 298 can have a non-circular shape). The second biasing member 308 biases the second scribing tool 300 along the direction "X5" so that the second scribing tool 300 engages with the component 100. The second biasing member 308 is embodied as a compression spring herein. Alternatively, the second biasing member 308 may include any other biasing device known in the art. In some examples, the second pin 306 may prevent any unintentional removal of the second scribing tool 300 from the second housing 280 when the second biasing member 308 is in an unbiased condition.

Referring now to FIGS. 1, 5, and 7, during the scribing of the component 100, a position of each of the first and second scribing assemblies 232, 238 may be adjusted based on the applicable dimension of the component 100. Specifically, the first and second scribing assemblies 232, 238 may be adjusted away from the spinner 226 such that a diameter defined by the first and second scribing tips 268, 302 is slightly greater than a diameter of the circumferential surface 104 of the component 100 to be scribed. Further, the scribing device 200 is positioned on the component 100 such that the stand 228 can fit within a central bore of the component 100. Furthermore, the first and second scribing tools 266, 300 are engaged with the circumferential surface 104 of the component 100. Specifically, the first biasing member 274 biases the first scribing tool 266 towards the circumferential surface 104 and the second biasing member 308 biases the second scribing tool 300 towards the circumferential surface 104. Moreover, the scribing device 200 is rotated to define the first annular scribe mark 106 and the second annular scribe mark 108 on the circumferential surface 104.

Industrial Applicability

The present disclosure relates to the scribing device 200 for scribing the component 100. The scribing device 200 includes the first and second scribing assemblies 232, 238. The first and second scribing assemblies 232, 238 are longitudinally slidable along the first and second rail portions 204, 206, respectively. Thus, the first and second scribing assemblies 232, 238 may be disposed at any location along the first and second rail portions 204, 206, respectively based on the applicable dimension of the component 100. The scribing device 200 is embodied as a modular and adjustable tool that may be used to define scribe marks/scribe lines on components having different dimensions. The scribing device 200 may be easy to use by users/operators. Further, the scribing device 200 may be quickly installed on the component 100. Moreover, the first and second aligning elements 254, 288 may allow self-alignment of the scribing device 200 which may reduce a time required to position the scribing device 200 and may also allow precise positioning of the scribing device 200 relative to the component 100.

Further, the spring-loaded first and second scribing tools 266, 300 may impart sufficient load on the circumferential surface 104 to scribe the first and second annular scribe marks 106, 108 on the component 100. Furthermore, the scribing device 200 may be easily rotated multiple times to ensure adequate scribe depth. Moreover, once the first and second annular scribe marks 106, 108 are defined, the scribing device 200 may be easily removed from the component 100. Further, the first and second annular scribe marks 106, 108 may be defined in a time effective manner, which may in turn reduce a total assembly time of an assembly, such as a rotor assembly that typically includes multiple rotor disks and therefore multiple scribing operations. Furthermore, the scribing device 200 described herein may allow accurate and precise marking of the first and second annular scribe marks 106, 108 at desired locations, which may reduce efforts required for post-weld testing.

Alternatively, both the first scribing tip 268 and the second scribing tip 302 could be supported by one scribing assembly and the associated scribing tool, such as the first scribing assembly 232 and the first scribing tool 266. In this arrangement (not depicted), in order to help the user to properly position and operate the scribing device 200, it may be desirable to include another assembly at the other end of the scribing device 200 with glides, rollers, and aligning elements comparable to the second glides 286, the second rollers 294, and the second aligning elements 288 shown in FIG. 6. This configuration would scribe markings on the component 100 in the manner already described with regard to the previous embodiment.

Figure 8:
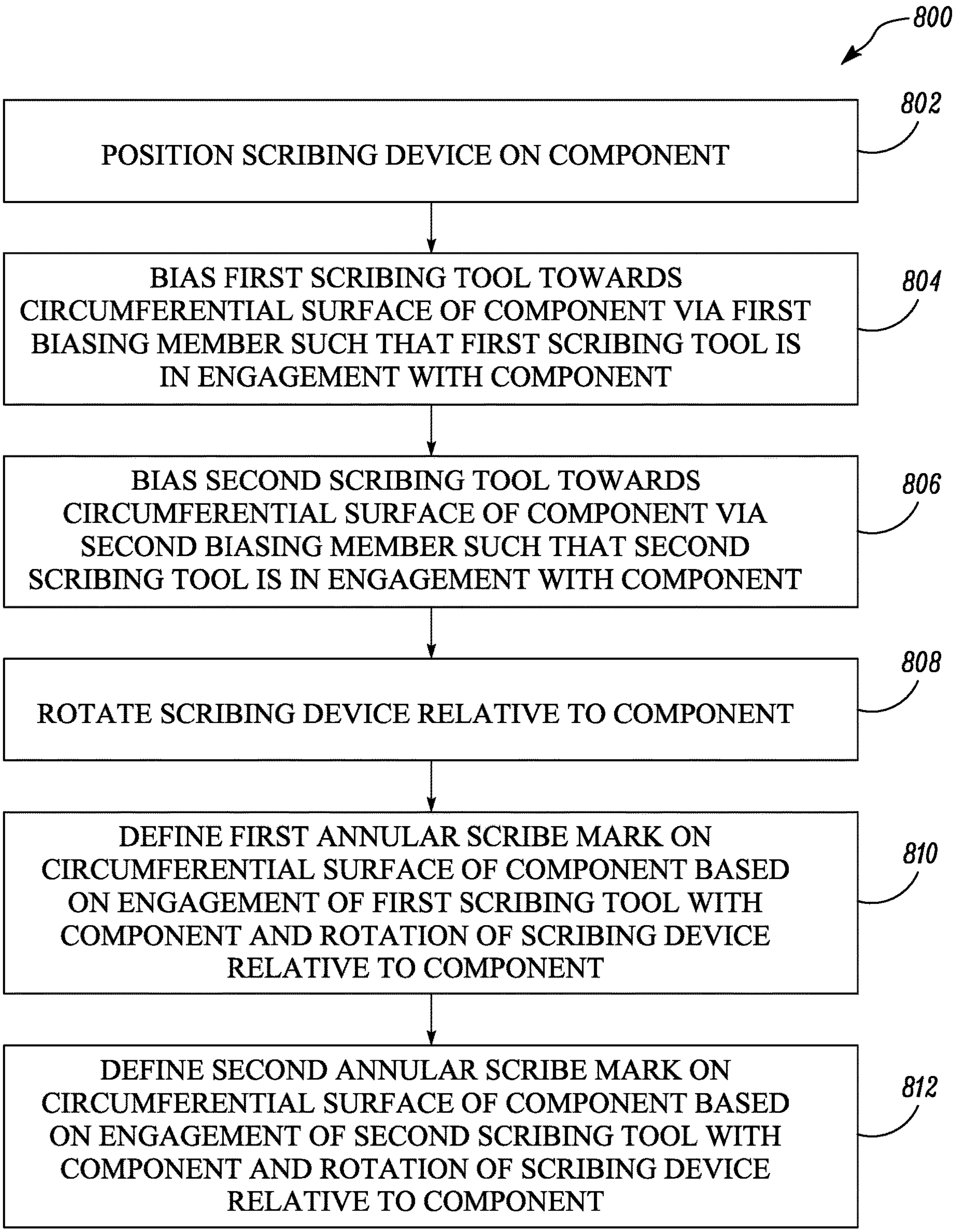
FIG. 8 is a flowchart depicting a method of scribing the component, according to an example of the present disclosure.

Referring to FIG. 8, a flowchart for a method 800 of scribing the component 100 is illustrated. At step 802, the scribing device 200 is positioned on the component 100. The scribing device 200 includes the holder 202, the first scribing assembly 232 coupled to the holder 202 and including the first scribing tool 266 and the first biasing member 274, and the second scribing assembly 238 coupled to the holder 202 and including the second scribing tool 300 and the second biasing member 308.

Further, to position the scribing device 200 on the component 100, the first scribing assembly 232 is slid along the first rail portion 204 of the holder 202. Furthermore, the first scribing assembly 232 is coupled to the first rail portion 204 such that the first scribing tool 266 is disposed proximate to the component 100. Moreover, the second scribing assembly 238 is slid along the second rail portion 206 of the holder 202. Further, the second scribing assembly 238 is coupled to the second rail portion 206 such that the second scribing tool 300 is disposed proximate to the component 100.

Furthermore, the first scribing assembly 232 includes the pair of first glides 252 and the pair of first aligning elements 254. To position the scribing device 200 on the component 100, the pair of first glides 252 are engaged with the radial surface 102 of the component 100, such that the pair of first glides 252 are in contact with the component 100, thereby positioning the first scribing assembly 232 in the axial direction X2 relative to the radial surface 102. Additionally, the first aligning elements 254 are engaged with the circumferential surface 104 of the component 100 for aligning the scribing device 200 relative to the component 100 in the radial direction X1.

Further, the second scribing assembly 238 includes the pair of second glides 286 and the pair of second aligning elements 288. To position the scribing device 200 on the component 100, the pair of second glides 286 are engaged with the radial surface 102 of the component 100, such that the pair of second glides 286 are in contact with the component 100, thereby positioning the second scribing assembly 238 in the axial direction X2 relative to the radial surface 102. Moreover, the second aligning elements 288 are engaged with the circumferential surface 104 of the component 100 for aligning the scribing device 200 relative to the component 100 in the radial direction X1.

At step 804, the first scribing tool 266 is biased towards the circumferential surface 104 of the component 100 via the first biasing member 274 such that the first scribing tool 266 is in engagement with the component 100. At step 806, the second scribing tool 300 is biased towards the circumferential surface 104 of the component 100 via the second biasing member 308 such that the second scribing tool 300 is in engagement with the component 100.

At step 808, the scribing device 200 is rotated relative to the component 100. At step 810, the first annular scribe mark 106 is defined on the circumferential surface 104 of the component 100 based on the engagement of the first scribing tool 266 with the component 100 and the rotation of the scribing device 200 relative to the component 100. Further, to define the first annular scribe mark 106 on the component 100, the first scribing tip 268 of the first scribing tool 266 is engaged with the component 100.

At step 812, the second annular scribe mark 108 is defined on the circumferential surface 104 of the component 100 based on the engagement of the second scribing tool 300 with the component 100 and the rotation of the scribing device 200 relative to the component 100. The first annular scribe mark 106 is axially spaced apart from the second annular scribe mark 108. Further, to define the second annular scribe mark 108 on the component 100, the second scribing tip 302 of the second scribing tool 300 is engaged with the component 100. Steps 810 and 812 can take place simultaneously.

Furthermore, the first scribing assembly 232 includes the first housing 244 coupled to the first scribing tool 266, and the first pin 272 coupled to the first scribing tool 266. Moreover, the method 800 includes a step of preventing, by the first pin 272, the removal of the first scribing tool 266 from the first housing 244.

Further, the second scribing assembly 238 includes the second housing 280 coupled to the second scribing tool 300, and the second pin 306 coupled to the second scribing tool 300. Furthermore, the method 800 includes a step of preventing, by the second pin 306, the removal of the second scribing tool 300 from the second housing 280.

Unless explicitly excluded, the use of the singular to describe a component, structure, or operation does not exclude the use of plural such components, structures, or operations or their equivalents. The use of the terms "a" and "an" and "the" and "at least one" or the term "one or more," and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B" or one or more of A and B") is to be construed to mean one item selected from the listed items (A or B) or any combination of two or more of the listed items (A and B; A, A and B; A, B and B), unless otherwise indicated herein or clearly contradicted by context. Similarly, as used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

While aspects of the present disclosure have been particularly shown and described with reference to the embodiments above, it will be understood by those skilled in the art that various additional embodiments may be contemplated by the modification of the disclosed work machines, systems and methods without departing from the spirit and scope of the disclosure. Such embodiments should be understood to fall within the scope of the present disclosure as determined based upon the claims and any equivalents thereof.

What is claimed is:

1. A scribing device for a component, the scribing device comprising:

a holder including a first rail portion and a second rail portion in alignment with the first rail portion;

a first scribing assembly coupled to the holder, the first scribing assembly is slidable along the first rail portion of the holder to dispose the first scribing assembly at any one of a plurality of locations along the first rail portion, the first scribing assembly including:

a first scribing tool including a first scribing tip configured to define a first annular scribe mark on a circumferential surface of the component, wherein a first perpendicular distance is defined between the first scribing tip and the first rail portion of the holder along a holder axis; and a first biasing member configured to bias the first scribing tool towards the circumferential surface of the component; and a second scribing assembly coupled to the holder and disposed in alignment with the first scribing assembly, the second scribing assembly is slidable along the second rail portion of the holder to dispose the second scribing assembly at any one of a plurality of locations along the second rail portion, the second scribing assembly including:

a second scribing tool including a second scribing tip configured to define a second annular scribe mark on the circumferential surface of the component, wherein a second perpendicular distance is defined between the second scribing tip and the second rail portion of the holder along the holder axis, and wherein the first perpendicular distance is different than the second perpendicular distance; and a second biasing member configured to bias the second scribing tool towards the circumferential surface of the component.

2. The scribing device of claim 1, wherein the first scribing assembly further includes a first housing, wherein the first housing couples the first scribing tool to the holder, and wherein the first biasing member is disposed between the first housing and the first scribing tool.

3. The scribing device of claim 2, wherein the first scribing tool includes a first coupling portion coupled to the first biasing member and the first housing, and wherein the first scribing tool further includes a first scribing portion extending from the first coupling portion and including the first scribing tip.

4. The scribing device of claim 1, wherein the second scribing assembly further includes a second housing, wherein the second housing couples the second scribing tool to the holder, and wherein the second biasing member is disposed between the second housing and the second scribing tool.

5. The scribing device of claim 4, wherein the second scribing tool includes a second coupling portion coupled to the second biasing member and the second housing, and wherein the second scribing tool further includes a second scribing portion extending from the second coupling portion and including the second scribing tip.

6. The scribing device of claim 1, wherein the first scribing assembly further includes a first pin coupled to the first scribing tool, and, optionally, the second scribing assembly further includes a second pin coupled to the second scribing tool.

7. The scribing device of claim 1, wherein the first scribing assembly further includes a pair of first glides configured to engage with a radial surface of the component during a scribing of the component and a pair of first aligning elements configured to engage with the circumferential surface of the component during the scribing of the component.

8. The scribing device of claim 1 further including a first clamping member and at least a first fastener that couple the first scribing assembly to the first rail portion, and, optionally, a second clamping member and at least a second fastener that couple the second scribing assembly to the second rail portion.

9. The scribing device of claim 1, wherein the second scribing assembly further includes a pair of second glides configured to engage with a radial surface of the component during a scribing of the component and a pair of second aligning elements configured to engage with the circumferential surface of the component during the scribing of the component.

10. The scribing device of claim 1, wherein the holder further includes:

a longitudinal member defining a first end and a second end, the longitudinal member including the first rail portion and the second rail portion;

a first handle coupled to the longitudinal member at the first end;

a second handle coupled to the longitudinal member at the second end; and a spinner coupled to the longitudinal member and centrally disposed between the first end and the second end.

11. A method of scribing a component, the method comprising:

positioning a scribing device on the component, the scribing device including a holder, a first scribing assembly coupled to the holder and including a first scribing tool and a first biasing member, and a second scribing assembly coupled to the holder and including a second scribing tool and a second biasing member;

biasing the first scribing tool towards a circumferential surface of the component via the first biasing member such that the first scribing tool is in engagement with the component;

biasing the second scribing tool towards the circumferential surface of the component via the second biasing member such that the second scribing tool is in engagement with the component;

rotating the scribing device relative to the component;

defining a first annular scribe mark on the circumferential surface of the component based on the engagement of the first scribing tool with the component and the rotation of the scribing device relative to the component; and defining a second annular scribe mark on the circumferential surface of the component based on the engagement of the second scribing tool with the component and the rotation of the scribing device relative to the component, wherein the first annular scribe mark is axially spaced apart from the second annular scribe mark.

12. The method of claim 11, wherein positioning the scribing device on the component further includes:

sliding the first scribing assembly along a first rail portion of the holder;

coupling the first scribing assembly to the first rail portion such that the first scribing tool is disposed proximate to the component;

sliding the second scribing assembly along a second rail portion of the holder; and coupling the second scribing assembly to the second rail portion such that the second scribing tool is disposed proximate to the component.

13. The method of claim 11, wherein defining the first annular scribe mark on the component further includes engaging a first scribing tip of the first scribing tool with the component.

14. The method of claim 11, wherein defining the second annular scribe mark on the component further includes engaging a second scribing tip of the second scribing tool with the component.

15. The method of claim 11, wherein the first scribing assembly further includes a first housing coupled to the first scribing tool, and a first pin coupled to the first scribing tool, the method further including preventing, by the first pin, a removal of the first scribing tool from the first housing.

16. The method of claim 11, wherein the first scribing assembly further includes a pair of first glides and a pair of first aligning elements, and wherein positioning the scribing device on the component further includes:

engaging the pair of first glides with a radial surface of the component, such that the pair of first glides are in contact with the component; and engaging the first aligning elements with the circumferential surface of the component for aligning the scribing device relative to the component.

17. The method of claim 11, wherein the second scribing assembly further includes a second housing coupled to the second scribing tool, and a second pin coupled to the first scribing tool, the method further including preventing, by the second pin, a removal of the second scribing tool from the second housing.

18. The method of claim 11, wherein the second scribing assembly further includes a pair of second glides and a pair of second aligning elements, and wherein positioning the scribing device on the component further includes:

engaging the pair of second glides with a radial surface of the component, such that the pair of second glides are in rolling contact with the component; and engaging the second aligning elements with the circumferential surface of the component for aligning the scribing device relative to the component.

19. A scribing device for a component, the scribing device comprising:

a holder including a rail portion; and a scribing assembly coupled to the holder, the scribing assembly is slidable along the rail portion of the holder to dispose the scribing assembly at any one of a plurality of locations along the rail portion, the scribing assembly including:

a scribing tool including a first scribing tip configured to define a first annular scribe mark on a circumferential surface of the component, wherein a first perpendicular distance is defined between the first scribing tip and a surface of the rail portion of the holder along a holder axis; and a biasing member configured to bias the scribing tool towards the circumferential surface of the component;

wherein the scribing tool further includes a second scribing tip configured to define a second annular scribe mark on the circumferential surface of the component, and wherein a second perpendicular distance is defined between the second scribing tip and the surface of the rail portion of the holder, the second perpendicular distance is different than the first perpendicular distance.

* * * * *